(12) United States Patent
Wolle et al.

(10) Patent No.: US 11,560,167 B2
(45) Date of Patent: Jan. 24, 2023

(54) TRANSPORT DEVICE AND TRANSPORT VEHICLE

(71) Applicant: TANOS GmbH Verpacken Ordnen, Illertissen (DE)

(72) Inventors: Lutz Wolle, Burlafingen (DE); Tjeerd Jan Pieter Gerbranda, Leipheim (DE); Tim Traas, Heinkenszand (NL)

(73) Assignee: TANOS GmbH Verpacken Ordnen Präsentieren, Illertissen (DE)

( * ) Notice: Subject to any disclaimer, the term of this patent is extended or adjusted under 35 U.S.C. 154(b) by 50 days.

(21) Appl. No.: 17/058,835

(22) PCT Filed: Jun. 1, 2018

(86) PCT No.: PCT/EP2018/064482
§ 371 (c)(1),
(2) Date: Nov. 25, 2020

(87) PCT Pub. No.: WO2019/228645
PCT Pub. Date: Dec. 5, 2019

(65) Prior Publication Data
US 2021/0206410 A1 Jul. 8, 2021

(51) Int. Cl.
*B62B 1/10* (2006.01)
*B62B 1/12* (2006.01)
*B62B 1/14* (2006.01)
*A47B 3/06* (2006.01)
(Continued)

(52) U.S. Cl.
CPC ................. *B62B 1/12* (2013.01); *A47B 3/06* (2013.01); *A47B 3/08* (2013.01); *B62B 1/10* (2013.01); *B62B 1/14* (2013.01); *B62B 1/26* (2013.01); *B62B 2202/12* (2013.01)

(58) Field of Classification Search
CPC .... B62B 1/10; B62B 1/12; B62B 1/14; B62B 1/26; B62B 2202/12; A47B 3/06; A47B 3/08
See application file for complete search history.

(56) References Cited

U.S. PATENT DOCUMENTS

| 6,386,557 | B1 * | 5/2002 | Weldon | B62B 1/264 280/654 |
| 6,543,796 | B1 * | 4/2003 | Johnson | B62B 1/12 280/30 |

(Continued)

FOREIGN PATENT DOCUMENTS

| AU | 2010101263 A4 * | 12/2010 | ............. A47B 85/06 |
| AU | 2010101263 A4 | 12/2010 | |

(Continued)

OTHER PUBLICATIONS

"Sys-Roll", Systainer, Verpacken Ordnen Prasentieren Transportieren, Tanos GmbH, 2 pages, 2014/2015.

*Primary Examiner* — Bryan A Evans
(74) *Attorney, Agent, or Firm* — Hoffmann & Baron, LLP

(57) ABSTRACT

A transport device with a transport vehicle. The transport device includes an elongated worktable and a worktable attachment interface provided on the transport vehicle by means of which the elongated worktable can be attached in a vertical orientation on the transport vehicle in order to assume a transport position in which the elongated worktable can be transported by the transport vehicle.

24 Claims, 14 Drawing Sheets

(51) Int. Cl.
*A47B 3/08* (2006.01)
*B62B 1/26* (2006.01)

(56) References Cited

U.S. PATENT DOCUMENTS

| | | | | |
|---|---|---|---|---|
| 7,367,571 B1 * | 5/2008 | Nichols | ................. | B62B 1/12 |
| | | | | 280/47.131 |
| 2014/0110447 A1 * | 4/2014 | Hilley | ................. | B62B 1/26 |
| | | | | 224/401 |

FOREIGN PATENT DOCUMENTS

| | | | | | |
|---|---|---|---|---|---|
| DE | 202007002551 | U1 | | 7/2007 | |
| DE | 202007002551 | U1 | * | 8/2007 | ............ A47B 35/00 |

* cited by examiner

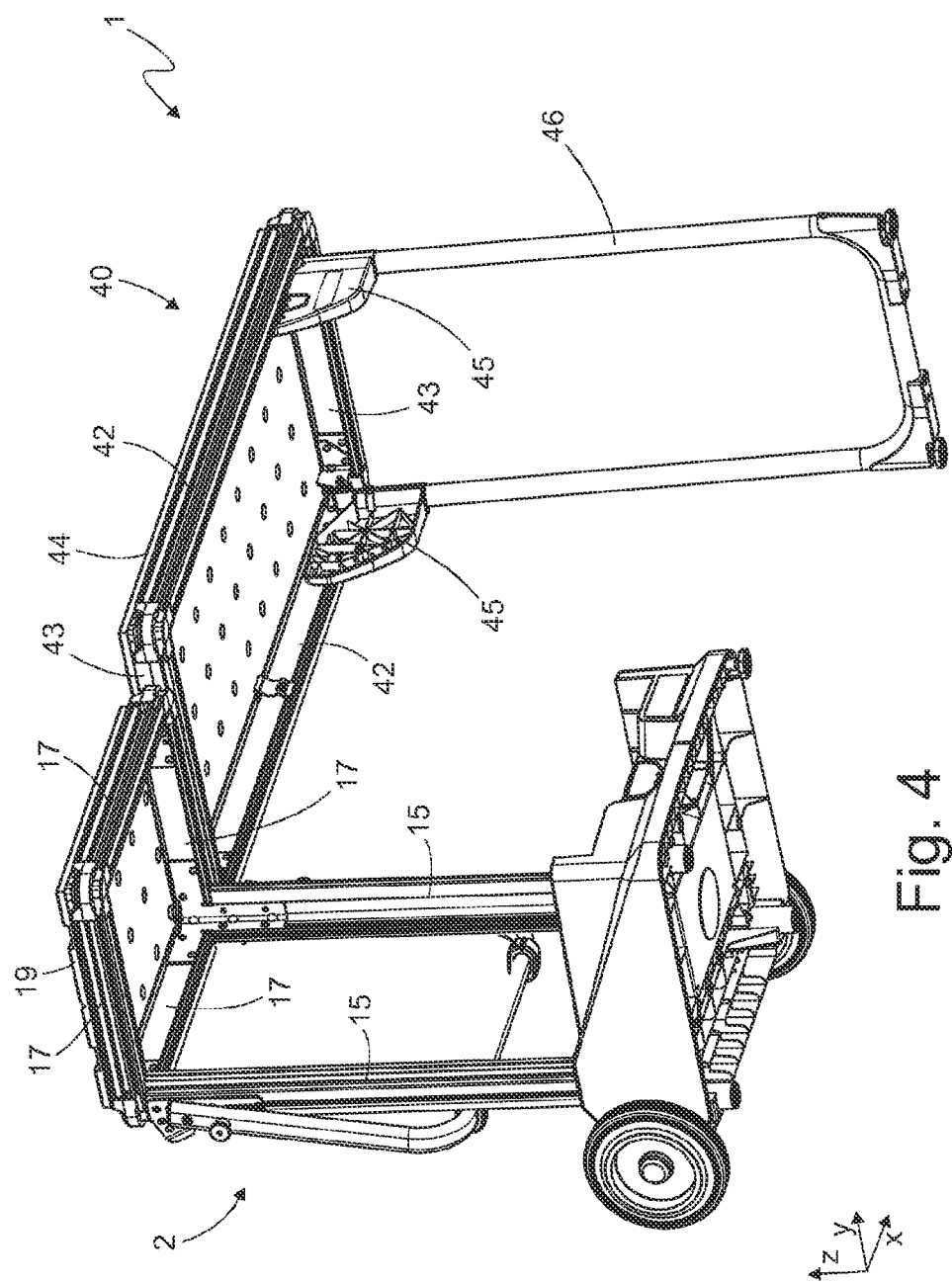

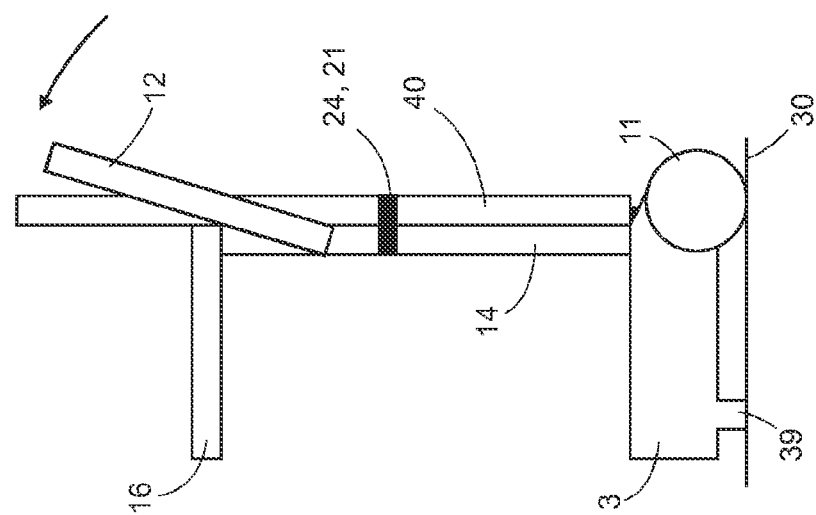
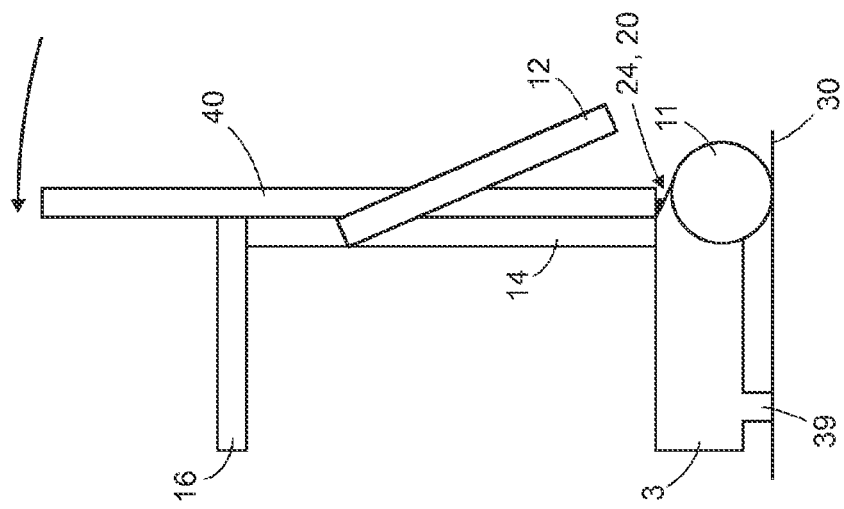
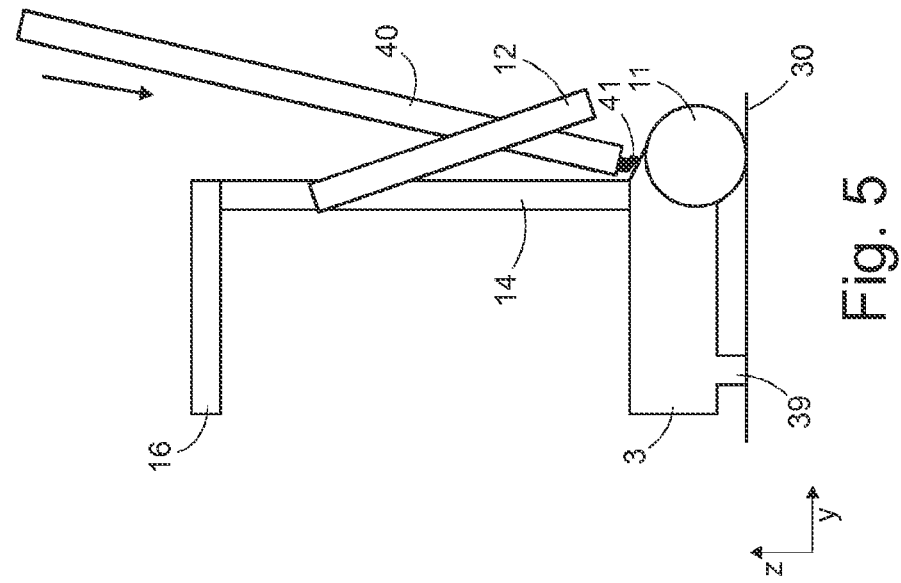
Fig. 7
Fig. 6
Fig. 5

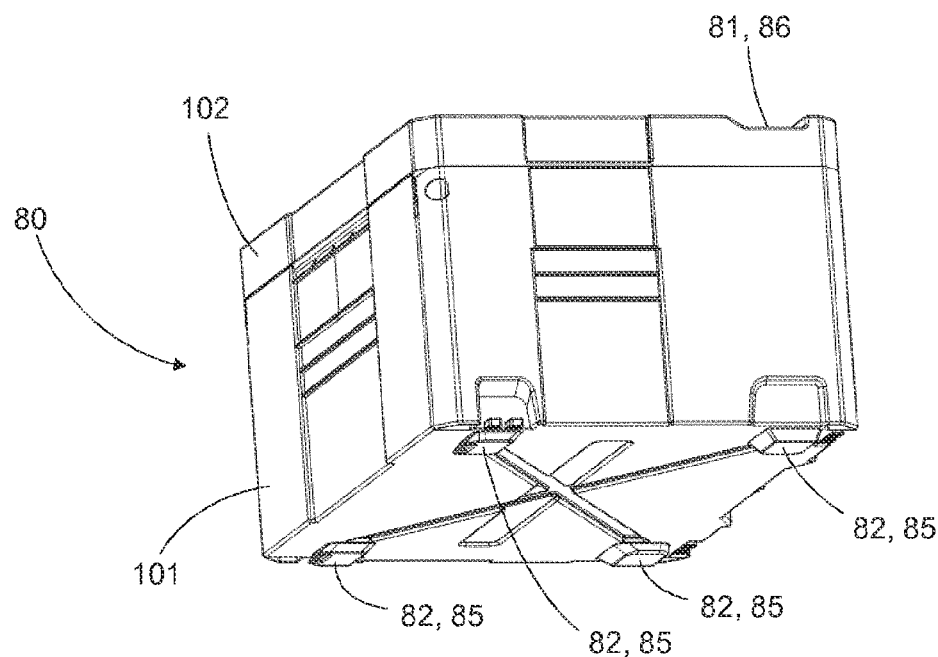
Fig. 21
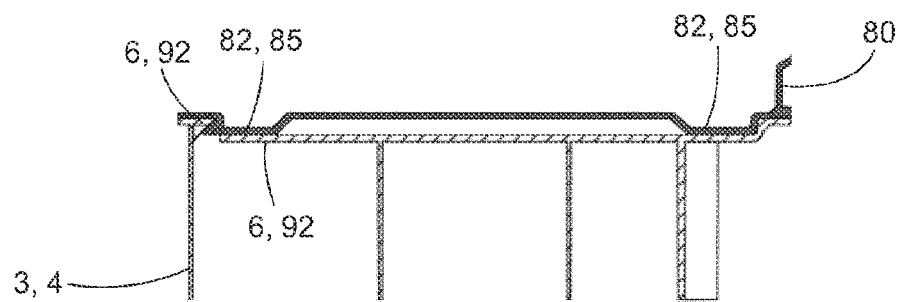
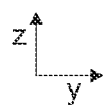
Fig. 22

TRANSPORT DEVICE AND TRANSPORT VEHICLE

This application claims priority based on an International Application filed under the Patent Cooperation Treaty, PCT/EP2018/064482, filed on Jun. 1, 2018.

BACKGROUND OF THE INVENTION

The invention relates to a transport device with a transport vehicle. The transport vehicle comprises:
- a lower section having a support surface on which a box-shaped container can be placed, and a container attachment interface for attaching the at least one box-shaped container to the lower section,
- two wheels located in a rearward area of the transport vehicle at the lower section, with which wheels the transport vehicle can be supported and moved relative to a floor, and
- a frame section extending vertically upwards from the lower section, which frame section is located in the rearward area and on which there is a handle with which the transport vehicle can be manually put into a tilted position and moved relative to the floor.

Such a transport vehicle is known from the state of the art. For example, the product "Sys-Roll" available from the company TANOS GmbH is known as a transport vehicle for the transport of box-shaped containers.

The transport vehicle mentioned at the beginning is typically used to transport one or more box-shaped containers to a job site, for example a construction site. The box-shaped container is usually used to store tools, for example a power tool, and/or tool accessories. In particular, the box-shaped containers are designed in such a way that they can be stacked on top of each other and coupled together in a vertically tension-proof manner to form a stable vertical, in particular cuboid, stack. To this end, each box-shaped container has the same horizontal outline and has couplers enabling them to be coupled together. The stack can be placed with the lowest box-shaped container on the support surface of the transport vehicle and attached by means of the container attachment interface. Expediently, the stack is attached to the transport vehicle with only the lowest box-shaped container.

The transport vehicle can be manually moved to a tilted position in which the transport vehicle is tilted with respect to the floor about a tilting axis defined by the wheels. In this position, the transport vehicle can be moved, especially pushed or pulled, in the manner of a sack truck.

The transport vehicle can also be referred to as a "sack truck like" or as sack truck.

A combination of the transport vehicle and the goods to be transported with it, for example the box-shaped container mentioned above, shall be referred to as the transport device.

SUMMARY OF THE INVENTION

It is an object of the invention to facilitate the transport of devices required at the job site.

The object is solved by a transport device according to claim 1. The transport device comprises an elongated worktable and a worktable attachment interface provided on the transport vehicle by which worktable attachment interface the elongated worktable can be attached to the transport vehicle in a vertical orientation to assume a transport position in which the elongated worktable can be transported by the transport vehicle.

Thus, in addition to the box-shaped container, the transport vehicle can also be used to transport an elongated worktable. The box-shaped container and the worktable can therefore be transported as a single unit—the transport device.

The result is a compact and easy to handle transport device that can be used to transport several devices required at the job site—namely one or more box-shaped containers and the worktable.

Expediently, the elongated worktable can be attached, by means of the worktable attachment interface, in a vertical orientation in the rearward area on the transport vehicle.

Since the worktable can be attached in the rearward area of the transport vehicle—i.e. in the area where the wheels are located—the worktable is located, when attached, in the area of the tilting axis of the transport vehicle, so that the torque required for tilting the transport vehicle can be kept low even when the worktable is attached.

The worktable and/or the box-shaped container can be removed (in particular completely) and/or attached to the transport vehicle tool-free—i.e. without the need for tools.

When attached, the elongated worktable is aligned vertically, especially with its longitudinal axis.

Advantageous embodiments are defined in the dependent claims.

BRIEF DESCRIPTION OF THE DRAWINGS

Exemplary details and embodiments are explained below with reference to the figures. Thereby shows.

DETAILED DESCRIPTION

In the following explanations, reference is made to the x-direction, y-direction and z-direction shown in the figures. The x-direction, y-direction and z-direction are orthogonal to each other. The x-direction can also be referred to as transverse direction, the y-direction as longitudinal direction and the z-direction as vertical direction. Furthermore, the x-direction and the y-direction can also be called horizontal directions. The reference system for the directions is the transport device 1 in an upright position.

Figure 1:
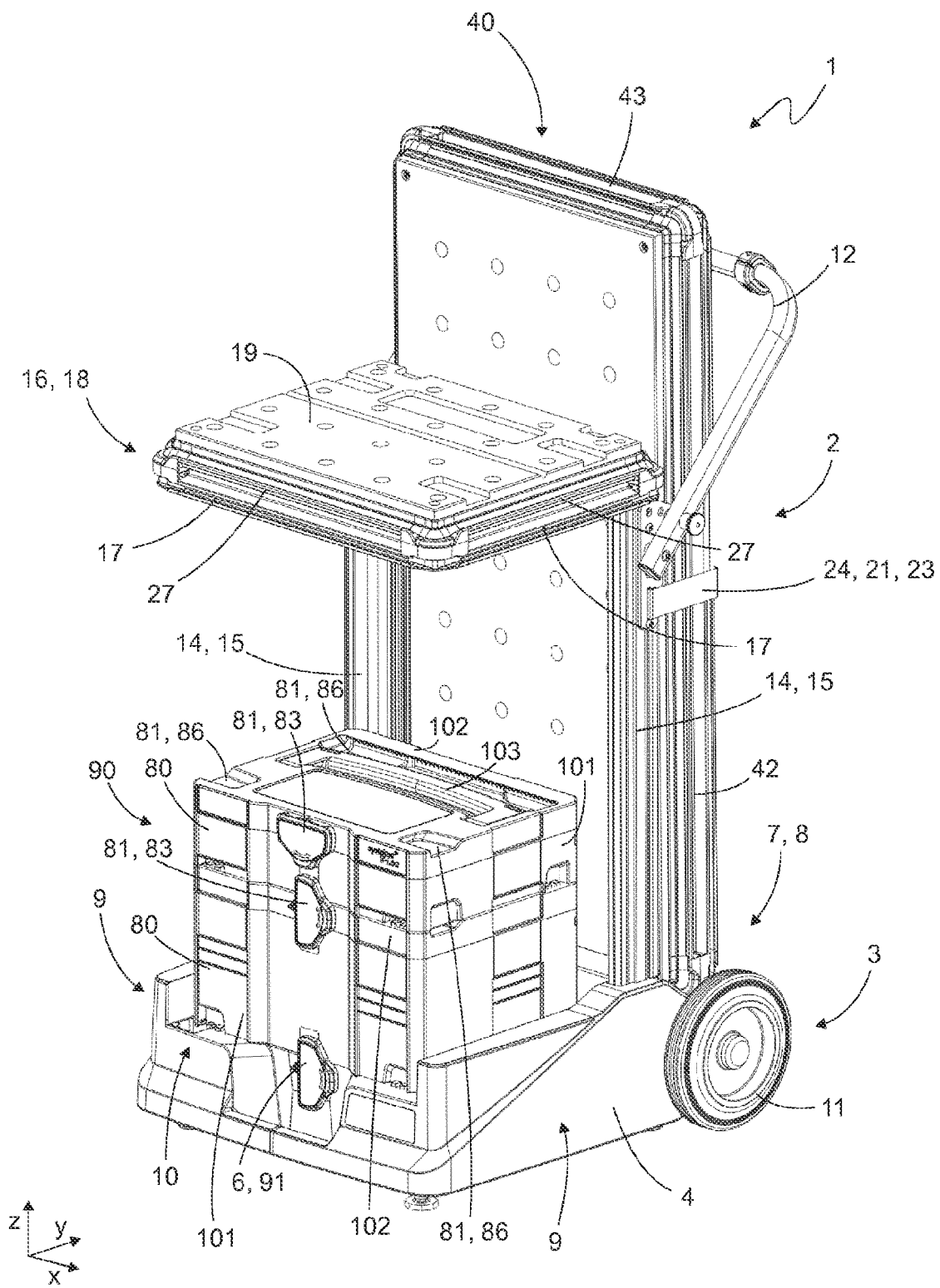
FIG. 1 a perspective view of a transport device with a transport vehicle, a stack of box-shaped containers and a worktable, FIG. 2 a perspective view of the transport vehicle, FIG. 3 a perspective view of the transport device in a working configuration, FIG. 4 another perspective view of the transport device in the working configuration, FIG. 5 a schematic side view of the transport device, FIG. 6 another schematic side view of the transport device, FIG. 7 another schematic side view of the transport device, FIG. 8 a perspective rear view of the transport device, FIG. 9 a detailed view of a first attachment device of the transport vehicle, FIG. 10 a perspective view of the transport device from above, FIG. 11 another detailed view of the first attachment device of the transport vehicle, FIG. 12 another perspective rear view of the transport device, FIG. 13 a detailed view of a second attachment device of the transport vehicle, FIG. 14 a sectional view of the first attachment device, FIG. 15 a side view of the transport vehicle with a handle in a first swivel position, FIG. 16 a side view of the transport vehicle with the handle in a second swivel position, FIG. 17 a side view of the transport vehicle with the handle in a third swivel position, FIG. 18 a rear view of the transport vehicle, FIG. 19 a detailed view of a positioning mechanism, FIG. 20 a view of components of the positioning mechanism, FIG. 21 a perspective view of a container, FIG. 22 a vertical sectional view through the underside of a container attached to the transport vehicle, FIG. 23 a container placed on a support surface of the transport vehicle.

FIG. 1 shows a transport device 1 with a transport vehicle 2. The transport vehicle 2 comprises a lower section 3. The lower section 3 has a support surface 5 on which a box-shaped container 80 is placed as an example. The support surface 5 is shown e.g. in FIG. 2. Exemplarily, in FIG. 1, a vertical stack 90, which comprises two box-shaped containers 80 stacked on top of each other and coupled to each other, is placed on the support surface 5.

The lower section 3 further has a container attachment interface 6, with which, as an example, the box-shaped container 80 or the vertical stack 90 is attached to the lower section 3.

The transport vehicle 2 further comprises two wheels 11 located in a rearward area 7 of the transport vehicle 2 at the lower section 3, with which wheels 11 the transport vehicle 2 can be supported and moved with respect to a floor 30, in particular in a tilted position. The term "rearward area" means in particular the y-section of the transport vehicle 2 which is located near the transverse rear side 8 of the transport vehicle 2.

The transport vehicle 2 further includes a frame section 14 extending vertically upwards from the lower section 3, which frame section 14 is located in the rearward area 7. A handle 12 is provided on the frame section 14 to manually put the transport vehicle 2 in a tilted position and move it relative to the floor 30.

The transport device 1 further comprises an elongated worktable 40 and a worktable attachment interface 24 provided on the transport vehicle 2, by which worktable attachment interface 24 the elongated worktable 40 is attached in a vertical orientation to the transport vehicle 2 to assume a transport position in which the elongated worktable 40 can be transported by the transport vehicle 2.

Further exemplary details are explained below.

Figure 2:
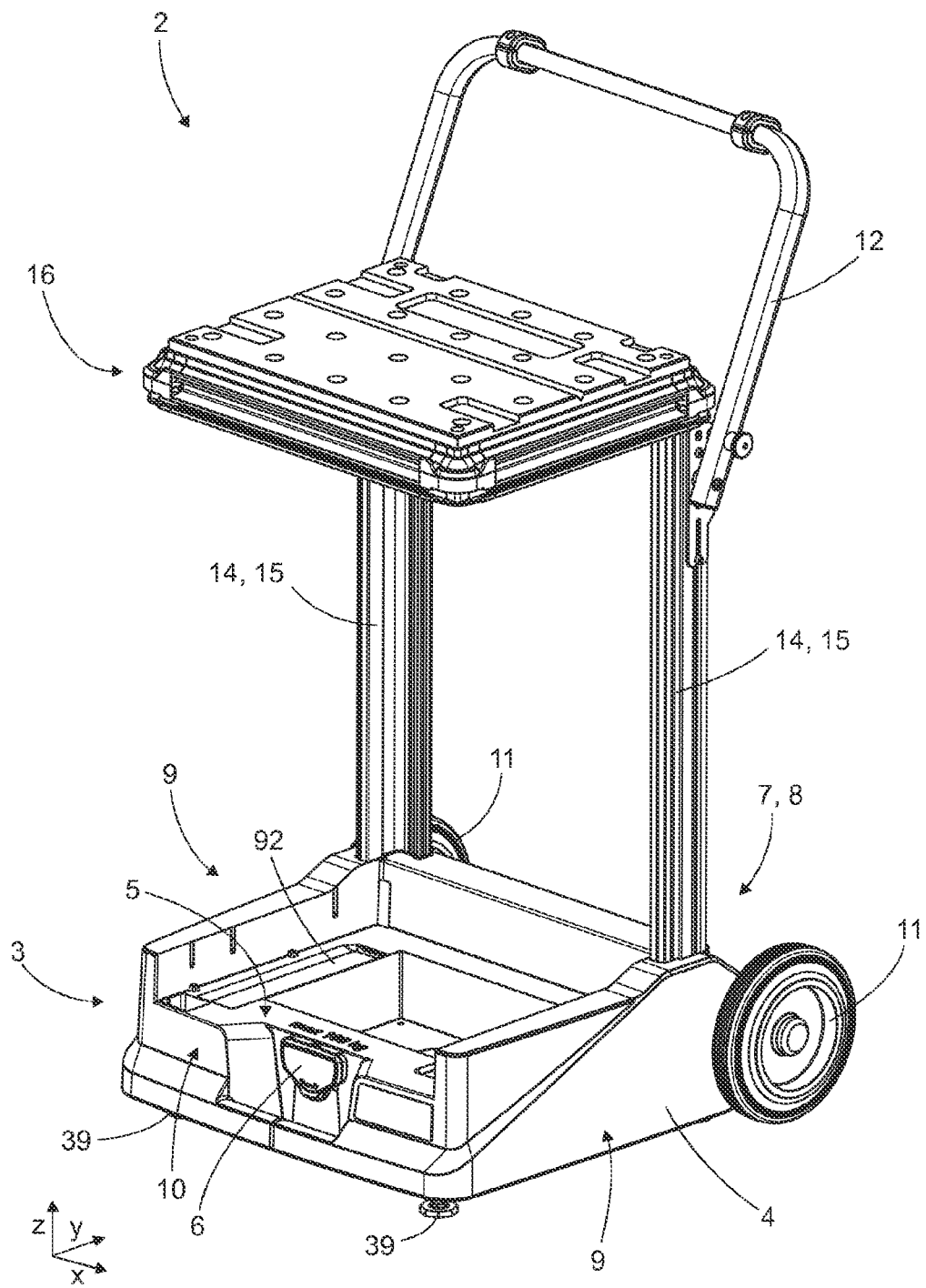

First to the basic construction of the transport vehicle 2:

FIG. 2 shows the transport vehicle 2 on its own—i.e. without box-shaped container and without worktable. The transport vehicle 2 can also be provided in this way—i.e. on its own.

In a y-z side view, the transport vehicle 2 (without the handle 12) essentially has the shape of a U turned by 90 degrees or the shape of a C. In a y-z side view, the lower section 3 and an upper section 16, which is explained below, each represent horizontal legs which are connected by the vertical frame section 14, preferably only by the vertical frame section 14.

The lower section 3 and the vertical frame section 14 together (without the handle 12) form an essentially L-shaped structure in a y-z side view.

The extension of the vertical frame section 14 in z-direction is greater than the extension of the lower section 3 in y-direction and greater than the extension of the upper section 16 in y-direction. The y-extension of the lower section 3 corresponds to the y-extension of the upper section 16. The vertical frame section 14 preferably occupies at least 60%, especially at least 70% of the z-extension of the transport vehicle 2 without the handle 12.

The transport vehicle 2 has a transverse front side 10, two longitudinal sides 9 and a transverse rear side 8. The lower section 3 is exemplarily formed by a bottom part 4, which has an essentially cuboid, especially flat, basic shape. The y-extension and x-extension of the bottom part 4 are each at least twice as large as the z-extension of the bottom part 4. One respective wheel 11 is arranged on each of the longitudinal sides 9, in the rearward area 7 of the transport vehicle 2, i.e. near the rear side 8. The two wheels 11 have coaxially arranged axes of rotation aligned in the x-direction.

The bottom part 4 has on its underside one, two or more feet 39, with which the transport vehicle 2 stands stably on a flat floor in standing position. As an example, the transport vehicle 2 stands in the standing position only on the feet 39, and especially not on the wheels 11.

The transport vehicle 2 can assume a standing position, in which it stands stable on the floor. In the standing position the lower section 3 is parallel to the floor 30 and the vertical frame section 14 is perpendicular to the floor 30. The transport vehicle 2 can also take up a driving position in which it is tilted relative to the floor, for example by approximately 45 degrees. The transport vehicle 2 can be tilted about the axis of rotation of the wheels 11 relative to the floor 30. In the driving position, the two wheels 11 support the transport vehicle 2 in relation to the floor 30 on which the transport vehicle 2 stands. In the driving position, the transport vehicle 2 can be set in motion by manual pushing or pulling. Consequently, the transport vehicle 2 can be handled like a sack truck and can also be described as sack truck like.

As already mentioned, FIG. 1 shows the transport device 1, i.e. the transport vehicle 2 with attached worktable 40 and box-shaped containers 80.

The transport device 1 is here in a transport configuration in which the box-shaped containers 80 and the worktable 40 are fixedly attached to the transport vehicle 2, so that, even in a driving position in which the transport device 1 is tilted with respect to the floor 30, the box-shaped containers 80 and the worktable 40 are stably attached to the transport vehicle 2 and can be transported by the transport vehicle 2. In the transport configuration, the worktable 40 can be removed from the transport vehicle 2 tool-free—i.e. without the use of tools.

In FIG. 1, the worktable 40 is in the transport position in which the worktable 40 is aligned with its longitudinal axis vertically—i.e. in the z-direction. In the transport position, the table plane of the worktable 40 is aligned parallel to an x-z plane. The x-extension of the worktable 40 corresponds to the x-extension of the vertical frame section 14. In the transport position, the worktable 40 rests against the vertical frame section 14 and expediently occupies the same x-area as the vertical frame section 14. In the z-direction, the worktable 40 extends in the transport position from the lower section 3 upwards and preferably projects above the transport vehicle 2, in particular the upper section 16 and/or the handle 12.

In the transport position, the worktable 40 is arranged behind the vertical frame section 14 in the rearward direction—i.e. in the y-direction towards the rear side 8. In the y-direction, the worktable 40 is located in the transport position on the side of the vertical frame section 14 facing the rear side 8. The support surface 5 is located on the other side as an example—i.e. on the side of the vertical frame section 14 facing the front side 10.

The vertical frame section 14 spans an x-z-plane. As an example, the vertical frame section 14 has two columnar frame elements 15 running parallel to each other, which are exemplarily designed as profiles. The vertical frame section 14 preferably consists of the two frame elements 15.

The two frame elements 15 each occupy the same y and z range and are offset from each other in the x direction. In the y-direction, the frame elements 15 are each located near the rear side 8, i.e. in the rearward area 7, and in the x-direction they are located in the area of the longitudinal sides 9. The two frame elements 15 are attached to the top side of the bottom part 4 and extend vertically upwards.

In z-direction, the vertical frame section 14 is followed by the upper section 16. As an example, the upper section 16 includes a table 18 integrated in the transport vehicle 2. The integrated table 18 exemplarily represents the vertical upper end of the transport vehicle 2 (without the handle 12). The upper section 16 has four longitudinal, horizontal frame elements 17, which are exemplarily designed as profiles. The frame elements 17 together form a horizontal frame section in the form of a rectangular frame on which a table top 19 of the integrated table 18 is arranged. The upper section 16 occupies essentially the same x-y range as the lower section 3. The upper section 16 has a cuboid, especially flat, basic shape.

As shown in FIG. 4, two of the horizontal frame elements 17 are aligned parallel to the x-direction and two of the horizontal frame elements 17 are aligned parallel to the y-direction. A frame element 17 parallel to the x-direction connects the two vertical frame elements 15 at their upper end and forms an inverted U together with the two frame elements 15 in x-z side view. The two frame elements 17 aligned parallel to the y-direction extend from the upper ends of the vertical frame elements 15 forward in the y-direction. The table top 19 is placed on the frame formed by the horizontal frame elements 17.

Figure 3:
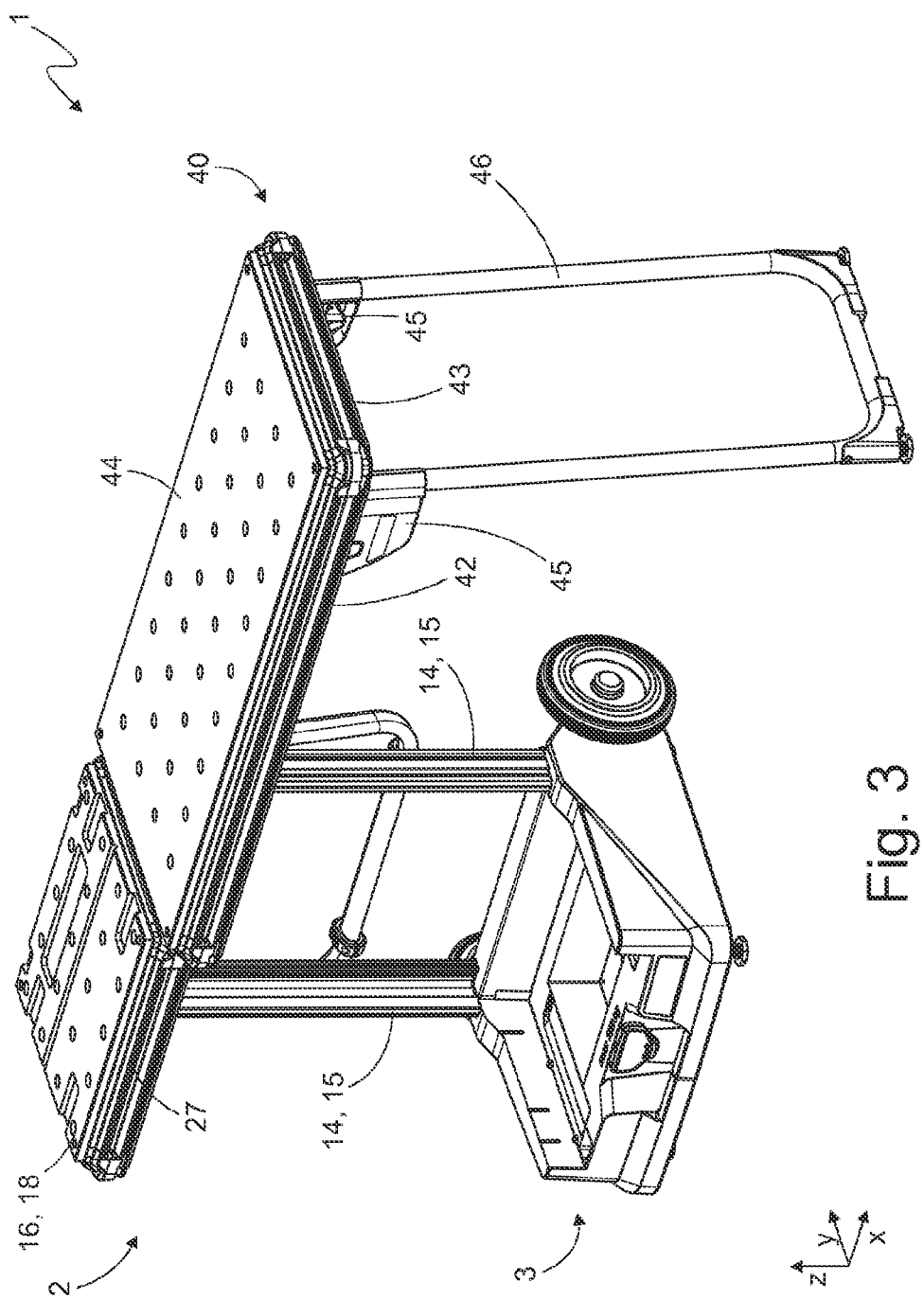

FIGS. 3 and 4 show the transport device 1 in a working configuration. In the working configuration, the worktable 40 is removed from the worktable attachment interface 24. Furthermore, the worktable 40 is in a horizontal orientation; i.e., its table plane is parallel to an x-y plane. The position of the worktable 40 shown in FIGS. 3 and 4 can also be referred to as the stationary working position. In the working position, the worktable 40 is supported at one of its ends by the transport vehicle 2, in particular by the upper section 16.

As an example, the upper section 16 has a support section 27 on which the worktable 40 is supported, in particular with an attachment element 41. The support section 27 can be seen in FIG. 1 and is present on one, several or all horizontal frame elements 17. Expediently, the support section 27 comprises a groove, in particular a V-groove, in which the attachment element 41 can engage.

In the working configuration, the attachment element 41 expediently engages with its attachment arrangement 48, which is explained below, and in particular with the attachment projections 53, in the groove of the support section 27. In the working configuration, the worktable 40 can be removed from the transport vehicle 2 tool-free—i.e. without the use of tools.

Expediently, a corresponding support section 27 is provided at the front 10, the two longitudinal sides 9 and/or the rear 8 of the transport vehicle 2, in particular the upper section 16, at which the worktable 40 can be supported. The worktable 40 can therefore be selectively attached to the front side 10, a first longitudinal side 9, a second longitudinal side 9 and/or the rear side 8.

In FIGS. 3 and 4, the worktable 40 is mounted on one longitudinal side 9 of the transport vehicle 2. The worktable 40 is aligned with its longitudinal axis parallel to the y-direction. As an example, the worktable 40 is attached to the integrated table 18 and extends it in the y-direction. In an x-y view, the worktable 40 and the integrated table 18 essentially form an elongated, rectangular shape whose x-extension is a multiple, in particular at least twice or three times, of the y-extension. The height of the worktable is preferably equal to the height of the integrated table 18. On the end face facing away from the transport vehicle 2, the worktable 40 is supported by a table leg arrangement 46, which is explained in more detail below.

Next, the worktable attachment interface 24 will be discussed in more detail, with particular reference to FIGS. 5 to 14.

The worktable attachment interface 24 is used to attach the worktable 40 to the transport vehicle 2 in such a way that worktable 40 can be stably transported by the transport vehicle 2. Preferably, the worktable attachment interface 24 is designed in such a way that the worktable 40 is fixed relative to the transport vehicle 2 in all spatial directions when attached.

Expediently, the worktable attachment interface 24 is designed in such a way that the elongated worktable 40 is attached in vertical alignment in the rearward area 7 on the transport vehicle 2.

Figure 8:
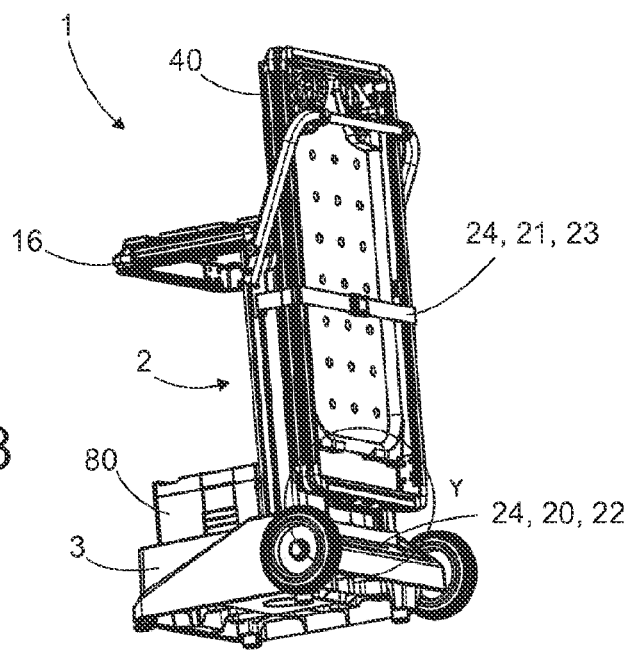

The worktable attachment interface 24 includes a first attachment device 20 and a second attachment device 21. The two attachment devices 20, 21 are shown in FIG. 8, for example.

The first attachment device 20 is designed such that the worktable 40 can be mounted with the attachment element 41 to the first attachment device 20 in a tilted orientation relative to the vertical frame section 14, and a vertical fixing to the first attachment device 20 is achieved by pivoting towards the vertical frame section 14. With the second attachment device 21, the worktable 40 can then be fixed horizontally, in particular to the vertical frame section 14.

FIGS. 5 to 7 schematically show the mounting of the worktable 40 to transport vehicle 2. In FIG. 5, the worktable 40 (removed from the vehicle 2) is moved in a tilted orientation relative to the frame section 14, with the attachment element 41 in front, to the first attachment device 20, preferably by a linear movement in a y-z direction.

The first attachment device 20 is designed such that the attachment element 41 can be mounted to the first attachment device 20 in this tilted orientation of the worktable 40, preferably only in this tilted orientation of the worktable 40. For example, the first attachment device 20 has a slot 22 which is designed such that the attachment element 41 can only be inserted into the slot 22 in the tilted orientation of the worktable 40.

In FIG. 6, the worktable 40 is pivoted towards the vertical frame section 14 in a state where the attachment element 41 is mounted to the first attachment device 20. Expediently, the attachment element 41 and the first attachment device 20 define an x-axis about which the worktable 40 can be pivoted. The worktable 40 can preferably be pivoted until it rests on the vertical frame section 14 and/or is aligned parallel to it. The first attachment device 20 is designed such that the attachment element 41 is fixed linearly in the pivoted state of the worktable 40 and thus the worktable 40 cannot be removed from the transport vehicle 2 by a linear movement, in particular not by a vertical linear movement.

In FIG. 7, the worktable 40 is horizontally fixed to the frame section 14 by the second attachment device 21—exemplarily by the belt 23—so that the worktable 40 cannot be pivoted. In this state, the worktable 40 is fixed in all spatial directions to the transport vehicle 2 and cannot be removed from it.

To remove the worktable 40, it is necessary to open the second attachment device 21 and to pivot the worktable 40 away from the frame section 14 so that it assumes the tilted orientation shown in FIG. 5. The worktable 40 can then be removed from the transport vehicle 2 by a linear movement in y-z direction.

In the following an exemplary design of the first attachment device 20 and the second attachment device 21 will be discussed in detail:

The first attachment device 20 is present at the lower section 3 and is located behind the vertical frame section 14 in the rearward direction. As an example, the first attachment device 20 includes an attachment structure 29 with which the attachment element 41 is engageable to attach the worktable 40 to the worktable attachment interface 24.

Figure 9:
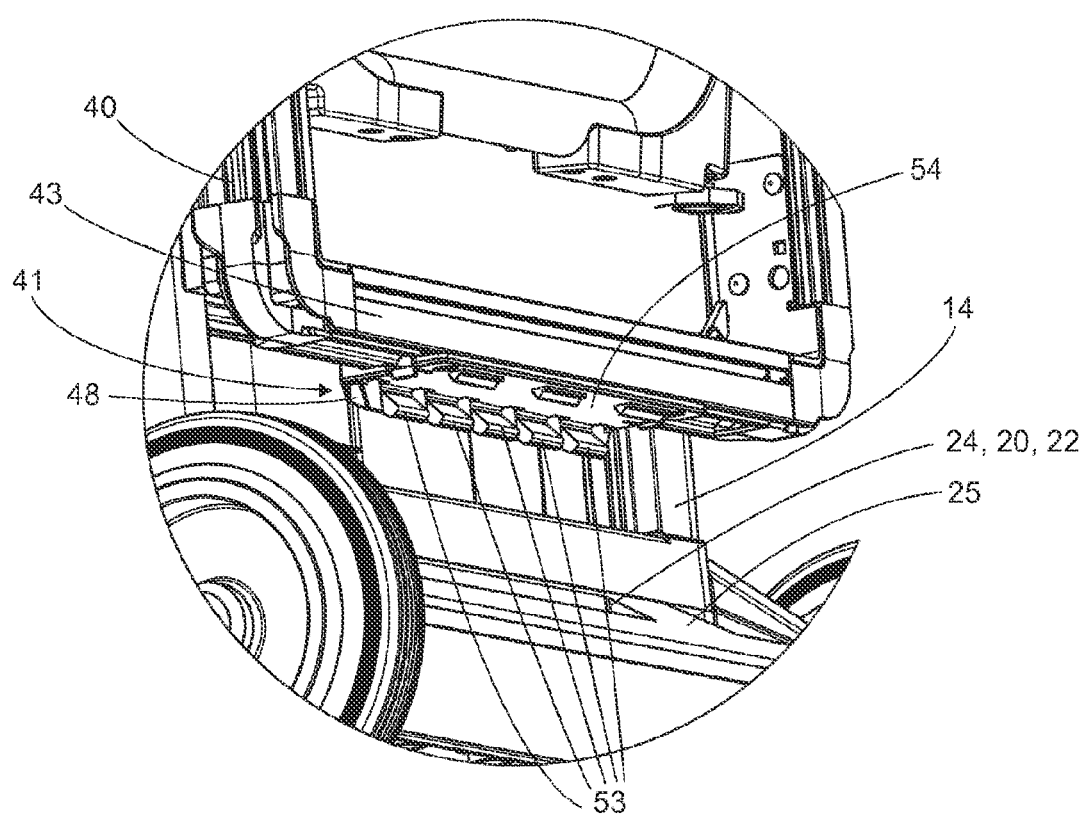

The lower section 3 has an angled upper side 25 in the area of the first attachment device 20, which angled upper side 25 expediently extends over more than half of the x-extension of the bottom part 4. The angled upper side 25 is shown in FIG. 9, for example. The normal vector of the angled upper side 25 points in a y-z direction. The angled upper side 25 serves to ensure that a worktable 40 that is not correctly attached to the first attachment device 20—for example, a worktable 40 that is merely placed on the upper side 25—does not stand stably on the upper side 25 with its attachment element 41, but instead slides off.

FIG. 9 shows the area marked with "Y" in FIG. 8 in detail.

FIG. 9 shows in particular the first attachment device 20, which comprises a slot 22 extending in the x-direction to receive the attachment element 41. The slot 22 is expediently located immediately behind the vertical frame section 14 in the y-direction. The slot 22 is located on the angled upper side 25.

FIG. 9 further shows the attachment element 41. The attachment element 41 is located at one face side of the worktable 40. As an example, the attachment element 41 is arranged on a transverse worktable frame element 43, which is exemplarily adapted as a profile element.

Figure 14:
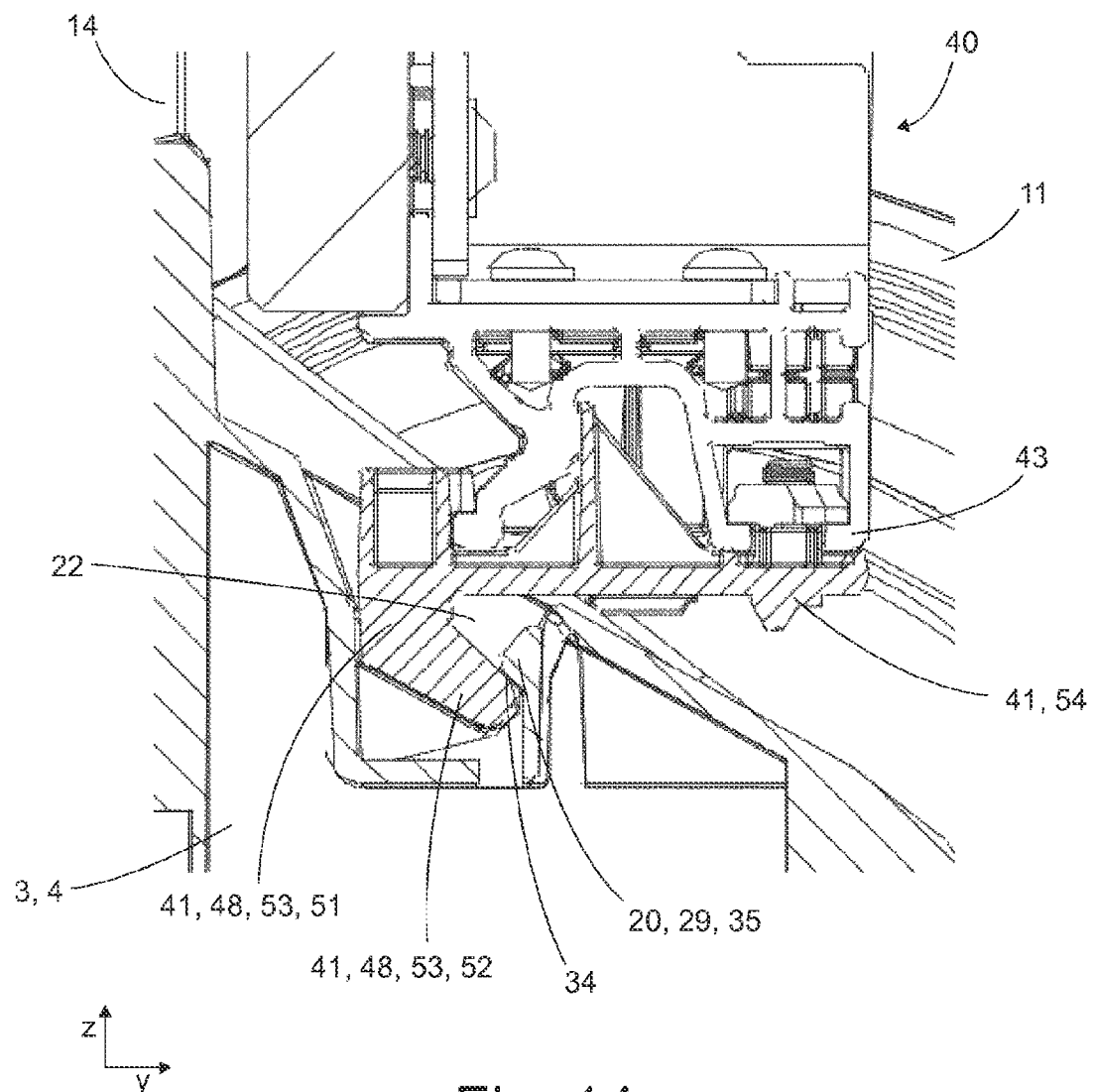

The attachment element 41 has an attachment arrangement 48. In a y-z side view (in the transport position of the worktable 40), the attachment arrangement 48 has an L-shaped basic shape with a vertical first leg 51 and a second leg 52 extending obliquely downward from the first leg 51 in a y-z direction. FIG. 14 shows a y-z side view of the attachment arraignment 48. As an example, the attachment arrangement 48 comprises a plurality of L-shaped attachment projections 53 arranged side by side in the x-direction, each with a corresponding first leg 51 and a second leg 52. For example, the attachment arrangement 48 has five attachment projections 53. Each two adjacent attachment projections 53 are spaced apart in the x-direction. It is possible to insert the attachment arrangement 48 into the slot 22.

The attachment element 41 further has a plate-shaped section 54, by which the attachment element 41 is attached to the worktable frame element 43. On the side of the plate-shaped section 54 facing away from the worktable frame element 43, the attachment arrangement 48 is arranged. Expediently, the attachment element 41 is a one-piece part. The attachment arrangement 48, in particular the entire attachment element 41, is expediently made of a flexible material, in particular plastic.

Figure 10:
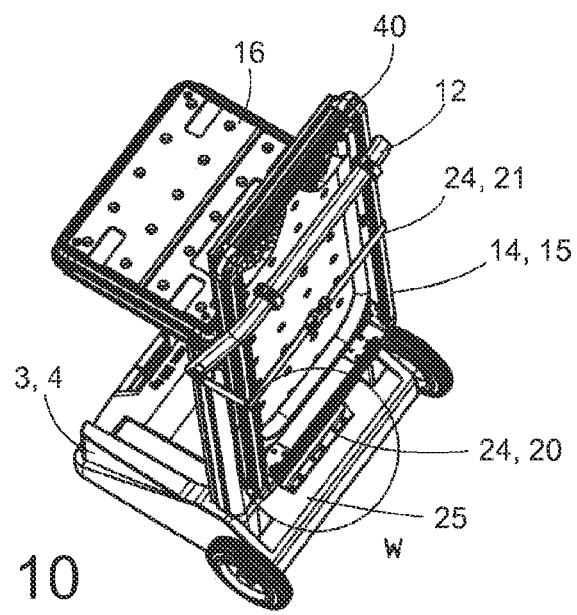
Figure 11:
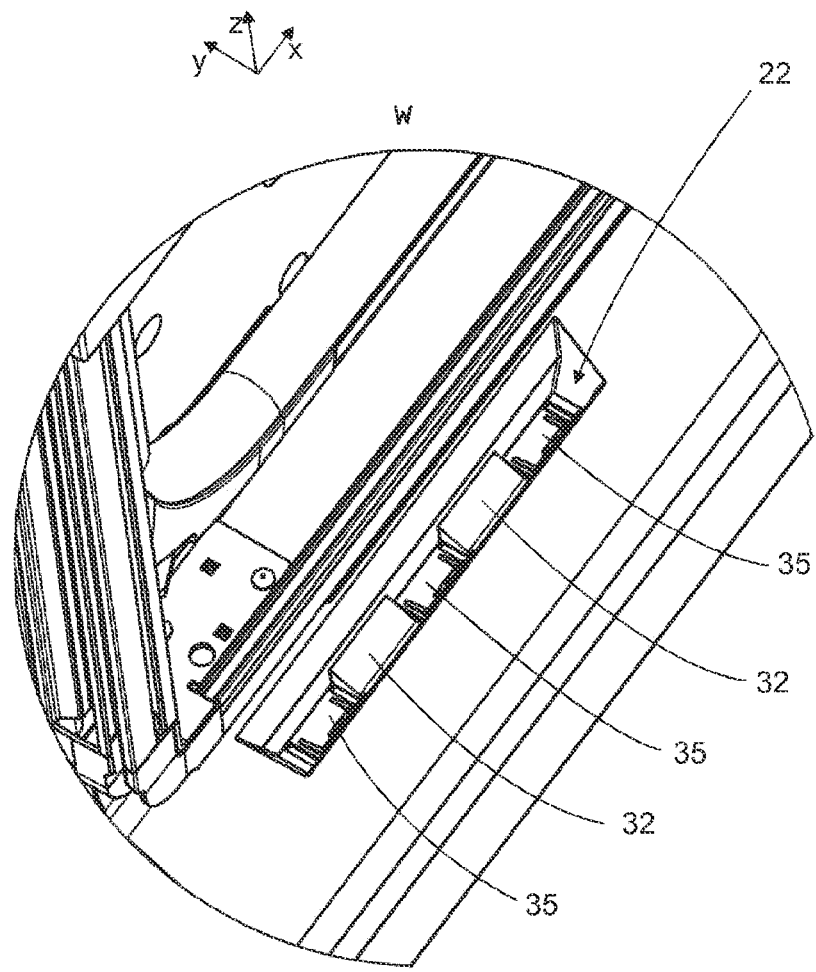
Figure 12:
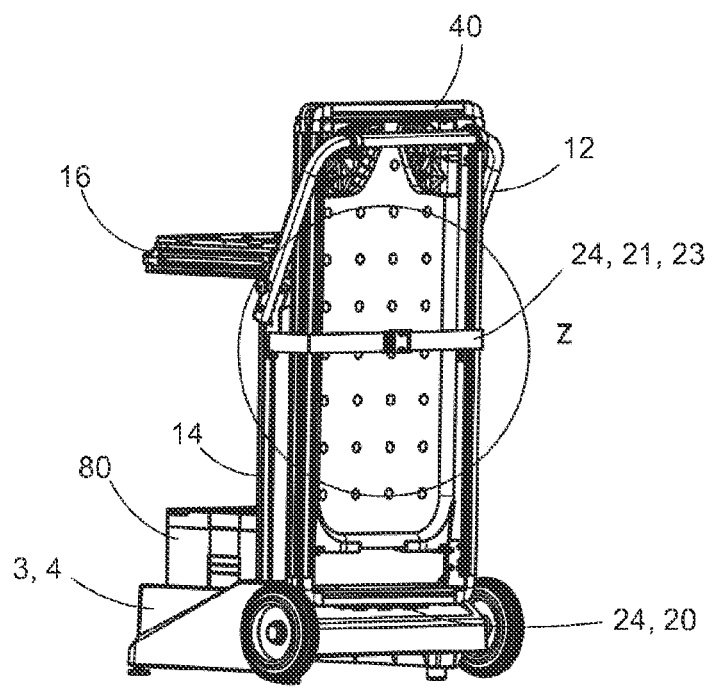
Figure 13:
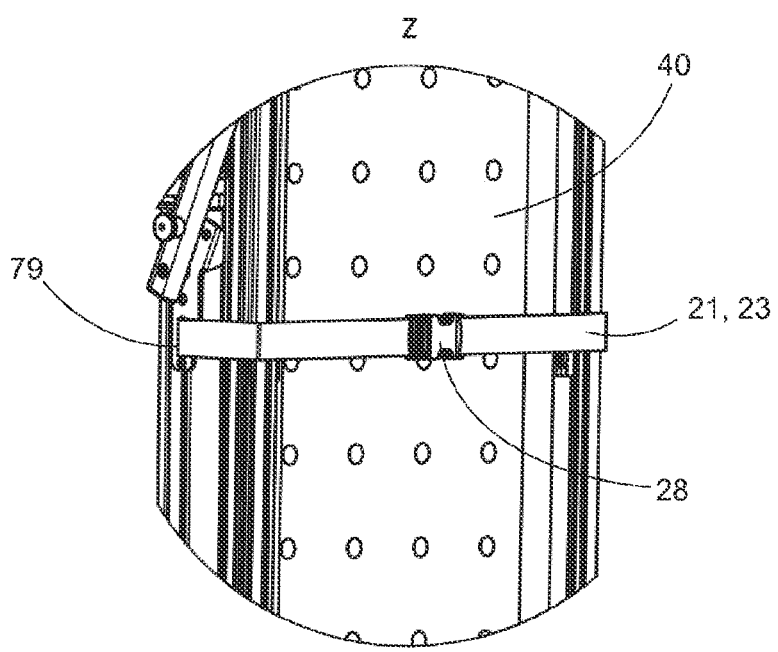

FIG. 11 shows the area marked with "W" in FIG. 10 in detail.

FIG. 11 shows in particular the slot 22. The attachment structure 29 is accessible via the slot 22. The slot 22 contains two angled reinforcing structures 32, which are spaced apart in the x-direction. Between the reinforcing structures 32 and in x-direction in front of and behind the reinforcing structures 32 there are catch hooks 35. The reinforcing structures 32 and the catch hooks 35 are arranged in correspondence with the attachment projections 53, so that when the attachment element 41 is inserted into the slot 22, several attachment projections, in particular the first, third and fifth attachment projection, are located in the area of the catch hooks 35.

FIG. 14 shows a y-z sectional view of the transport device 1. FIG. 14 shows in particular the attachment structure 29 and the attachment element 41 which engages with the attachment structure 29. The attachment structure 29 comprises an attachment surface 34 which the attachment arrangement 48, in particular the second leg 52 of the attachment projections 53, engages behind. The attachment surface 34 is formed by a horizontal projection. The horizontal projection can be part of an L-shaped catch hook 35, which is spring-loaded on the rear wall of the attachment structure 29. Preferably, several L-shaped catch hooks are arranged next to each other in the x-direction, so that each L-shaped catch hook can be engaged with a respective attachment projection 53. Preferably, no L-shaped catch hook is provided for every second attachment projection 53, in particular for the second and fourth attachment projection 53, and preferably a reinforcing structure 32 is provided instead.

The attachment arrangement 48 and the slot 22 are designed, in particular dimensioned, such that the attachment arrangement 48 can only be inserted into the slot 22 when the worktable 40 is in the tilted orientation mentioned above. In order to bring the attachment arrangement 48 into engagement with the attachment structure 29, it is necessary to pivot the worktable 40 into a vertical orientation so that the attachment projections 53 engage behind the attachment surface 34.

The worktable attachment interface 24 has a second attachment device 21, which is located on the vertical frame section 14. The second attachment device 21 is shown in particular in FIGS. 12 and 13. The second attachment device 21 is exemplarily located in the upper area of the vertical frame section 14. The second attachment device 21 comprises a belt 23, with which the worktable can be fixed in horizontal direction to the vertical frame section 14 in the transport position. The belt 23 is exemplarily fixed at two anchoring points 79. The two anchoring points 79 are at the same height. For example, the belt 23 is laid transversely around the worktable 40 in the transport position. In this state, the belt 23 has a U-shaped course in an x-y view. The belt 23 has a locking element 28 with which it can be opened to release or receive the worktable 40 and can be closed to secure the worktable 40. As an example, the locking element 28 is arranged in the x-direction in the center of the belt 23.

In the following, the handle 12 will be explained in more detail, especially with reference to the FIGS. 15 to 17:

The handle 12 is expediently bow-shaped, especially U-shaped.

The handle 12 has two outer sections 36, with which the handle is attached to the vertical frame section 14 in a pivoting manner. The two outer sections 36 are connected by a middle section 37 running in the x-direction. The middle section 37 is equipped with two sliding elements 38, which can be used to support the handle 12 against a floor when the transport vehicle 2 is tilted by 90 degrees around an x-axis.

When the worktable 40 is attached to the worktable attachment interface 24, the bow-shaped handle 12 expediently runs around the worktable 40. In particular, the worktable 40 runs through a plane spanned by the handle 12.

The transport vehicle 2 is equipped with a positioning mechanism 26 with which the handle 12 can be positioned and fixed in at least two different swivel positions. For example, the handle 12 can be fixed in three different swivel positions by the positioning mechanism.

Figure 17:
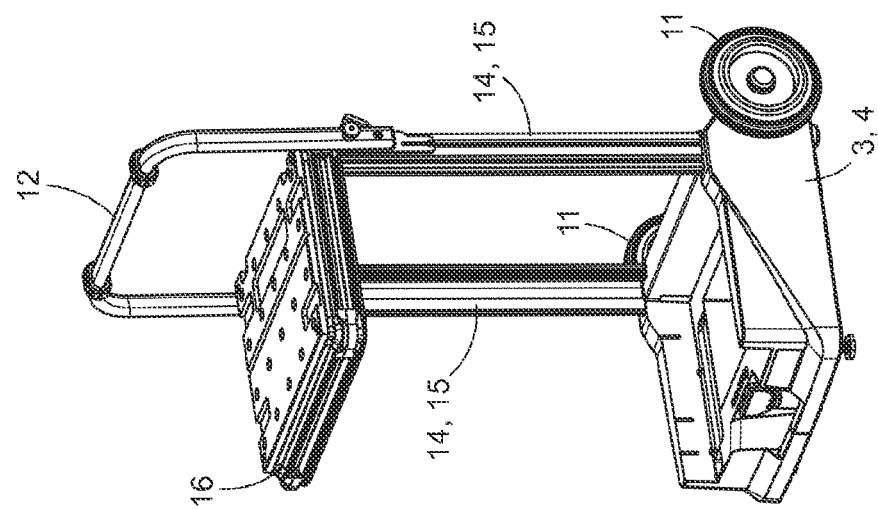
Figure 16:
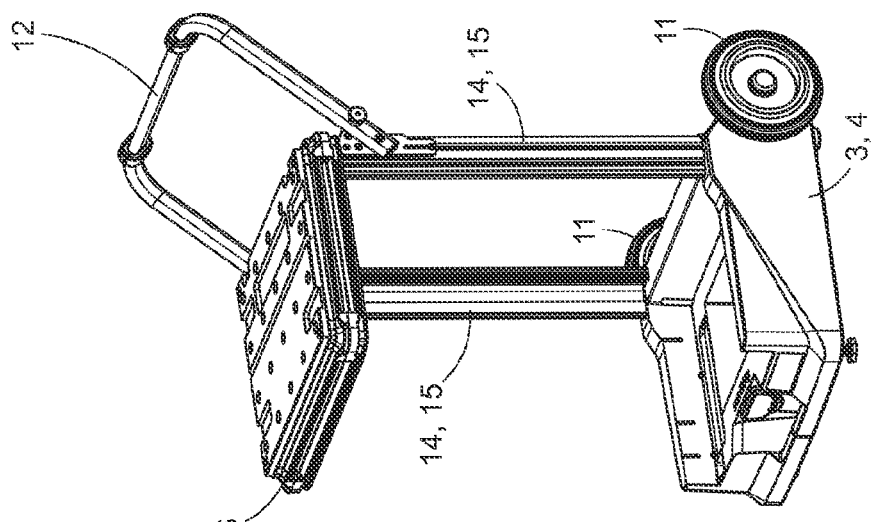
Figure 15:
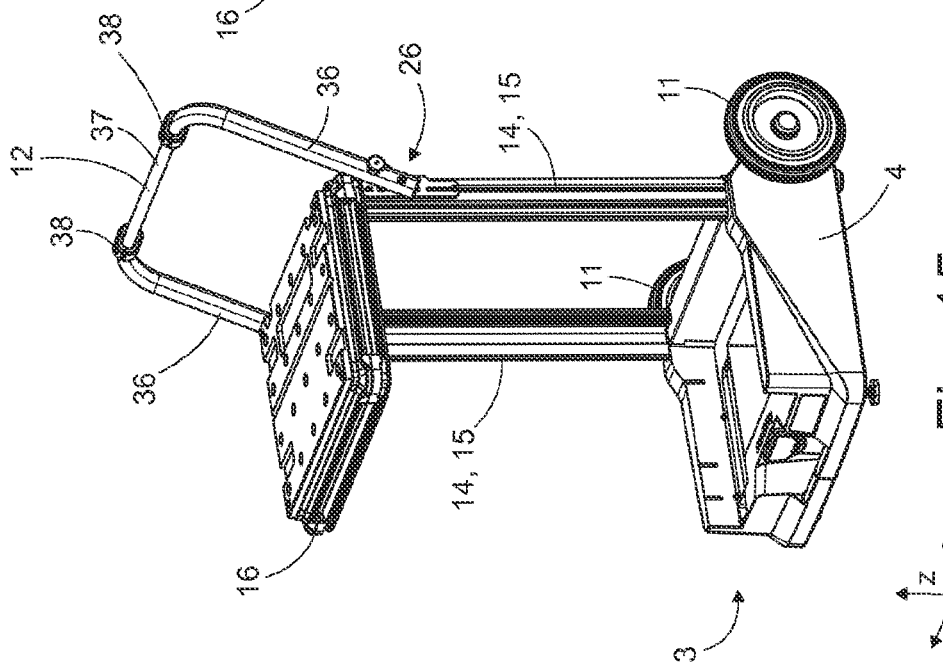

FIGS. 15 to 17 show the handle 12 in three different swivel positions in which the handle 12 can be fixed by the positioning mechanism 26.

FIG. 15 shows a first swivel position of the handle 12. This swivel position can also be referred to as the fixing position. In the first swivel position, the handle 12, in a state in which the worktable 40 is attached to the first attachment device 20, limits the maximum tilt angle of the worktable 40 such that a tilt angle that must be assumed by the worktable 40 in order to release the attachment of the worktable 40 from the worktable attachment interface 24 cannot be assumed. For example, the fixing position is also shown in FIG. 7: in FIG. 7 the handle 12 is in the fixing position—thus limiting the tilt angle of the worktable 40 so that the attachment to the first attachment device 20 cannot be released. In the fixing position, the angle of rotation (relative to the z-axis) of the handle 12 is in particular between 10 and 40 degrees. Expediently, the handle 12, in particular the sliding elements 38, is flush with the wheels 11 in the y-direction so that the transport vehicle 2 can be placed in an upright standing position with its rear side 8 as close as possible to a straight wall.

FIG. 16 shows a second swivel position of the handle 12. The second swivel position has a larger swivel angle than the first pivoting position and is particularly practical for loading the transport vehicle 2 into a vehicle. In particular the transport vehicle 2 can be driven with its rear side 8 to the loading edge of a passenger car, for example a small transporter, and then be tilted around the axis of rotation defined by the wheels 11 until the handle 12, which is in the second swivel position, rests on the loading area of the passenger car, especially with its sliding elements 38. The transport vehicle 2 can then be lifted at its bottom part 4 and pushed into the loading space of the car. There the transport vehicle 2 can be raised again so that it takes the vertical standing position. The handle 12 can then be moved into the first swivel position so that the transport vehicle 2 can be placed with its rear side 8 as close as possible to a wall in the loading space. The described method for loading the transport vehicle 2 is also applicable to the transport device 1, i.e. in case the worktable 40 and/or one or more box-shaped containers 80 are attached to the transport vehicle 2.

FIG. 17 shows a third swivel position of the handle 12. In the third swivel position, the handle 12 is oriented vertically upwards; the swivel angle is 0 degrees. In this swivel position the transport vehicle 2 can be handled and transported particularly well without the worktable 40.

FIGS. 5 and 6 show the handle 12 in a fourth swivel position. Preferably, the handle 12 cannot be fixed in the fourth swivel position. In the fourth swivel position, the handle 12 has a swivel angle of more than 90 degrees and/or less than 170 degrees.

The fourth swivel position allows a tilt angle of the worktable 40, at which tilt angle the worktable 40 can be attached to and removed from the worktable attachment interface 24. As shown in FIG. 5, in the fourth swivel position of the handle 12, the worktable 40 can be pushed through the handle 12 with its attachment element 41 in front to the first attachment device 20.

FIG. 3 shows the handle 12 in a fifth swivel position. Preferably, handle 12 cannot be fixed in the fifth swivel position. In the fifth swivel position, the handle 12 assumes its maximum swivel angle, e.g. a swivel angle of more than 160 degrees, and expediently rests against the vertical frame section 14.

Figure 19:
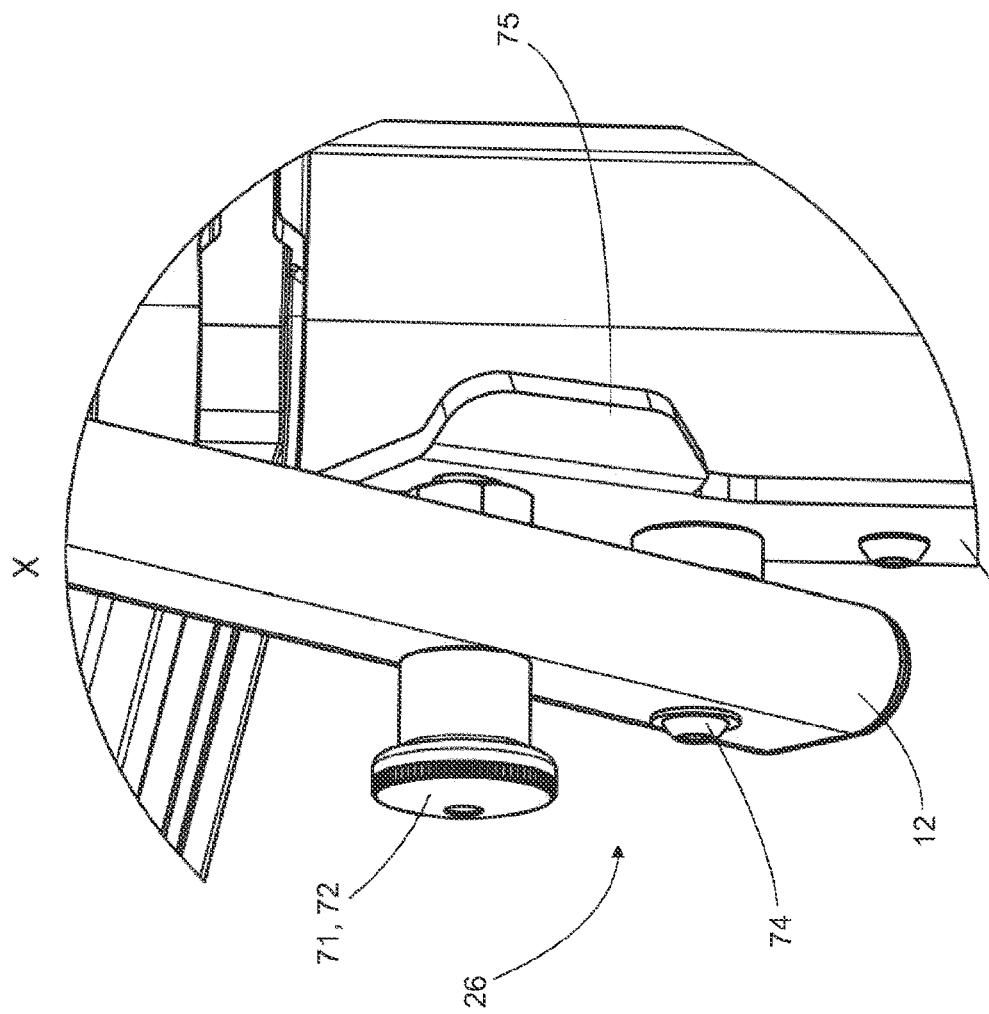
Figure 18:
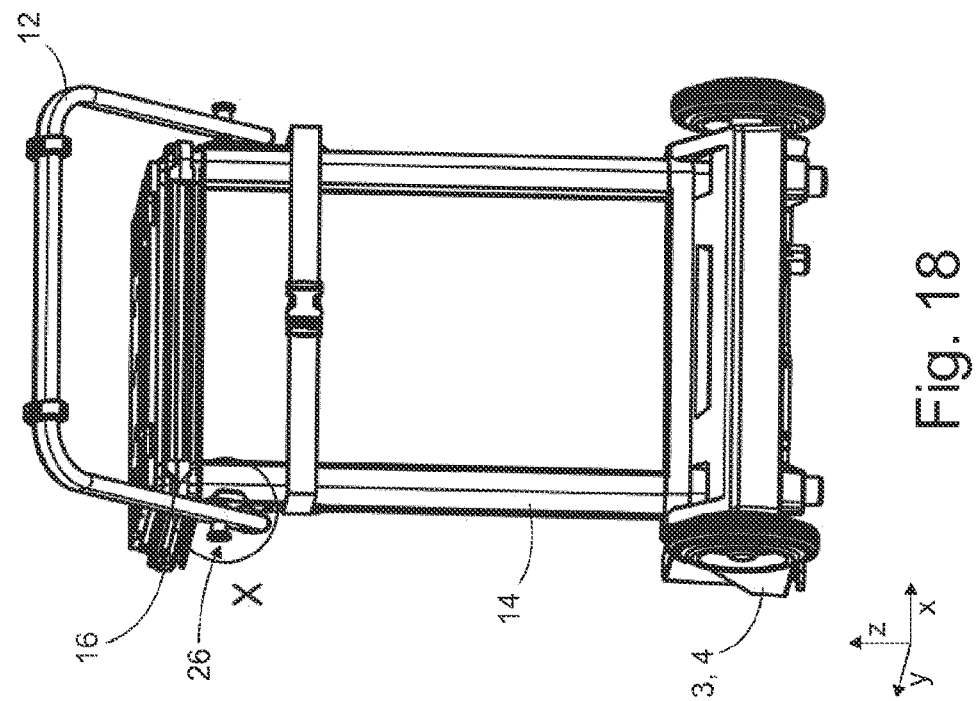
Figure 20:
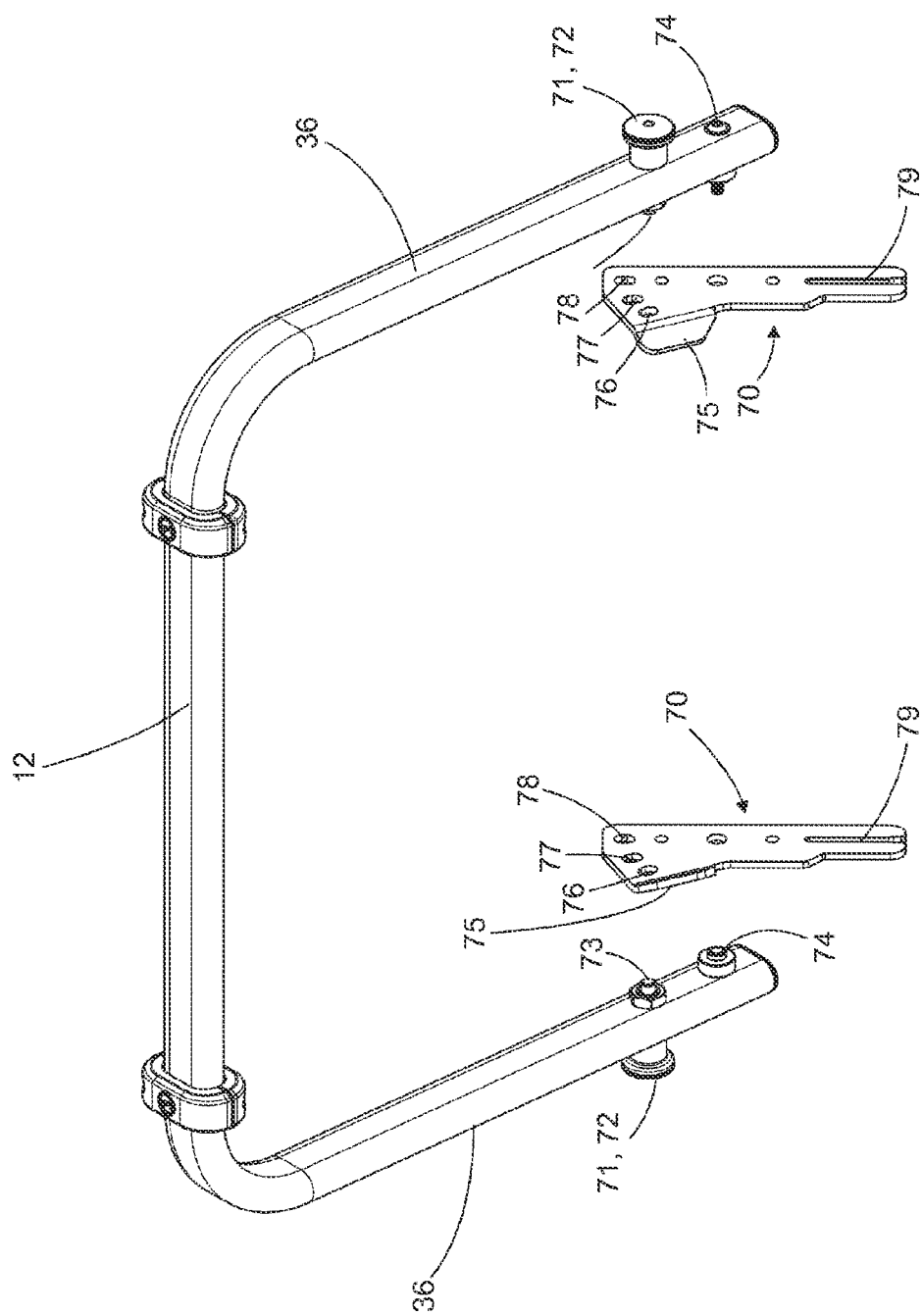

With reference to FIGS. 18 to 20, an exemplary design of the positioning mechanism 26 will be explained below.

The positioning mechanism 26 is expediently adapted to fix the handle 12 at one or more predetermined swivel positions, in particular two or three predetermined swivel positions, so that it is held fixedly in the one or more predetermined swivel positions. The swivel positions in which the handle 12 can be fixed are in particular the first, second and/or third swivel position. Preferably, the positioning mechanism is designed such that the handle 12 is fixed automatically when the handle 12 is moved to a predetermined swivel position.

As an example, the positioning mechanism 26 has a locking device 71 located on the handle 12 with a locking element 73 which is engaged at one or more predetermined swivel angles in a locking structure located on the vertical frame section 14. The locking element 73 is expediently preloaded by a spring element (not shown in the figures) so that it engages the locking structure automatically when the handle assumes a predetermined swivel angle.

As an example, the locking structure includes several holes 76, 77, 78, which are shown in FIG. 20. The locking device 71 comprises as the locking element 73 exemplarily a locking bolt, which can be selectively positioned over one of the holes 76, 77, 78 by swivelling the handle 12 so that the locking bolt snaps into this hole, thereby fixing the handle 12 in the corresponding swivel position. The holes 76, 77, 78 are expediently located on a circular path that is traversed by the locking element 73 when the handle 12 is swivelled. Preferably, the hole 77 is associated with the first swivel position, the hole 76 with the second swivel position and the hole 78 with the third swivel position.

The locking device 71 is expediently equipped with an operating section 72, with which the engagement of the locking element 73 in the locking structure—and thus the fixation of the handle 12 in a certain swivel position—can be released manually. As an example, the operating section 72 is a knob with which the locking bolt can be pulled out of a hole 76, 77, 78.

The locking device 71 is expediently located in an end area of an outer section 36 of the handle 12. Expediently, the operating section 72 is located on a side of the outer section 36 facing away from the frame section 14, and the locking element 73 to be located on a side of the outer section 36 facing towards the frame section 14. Preferably, the locking device 71 penetrates the outer section 36. For example, there is a locking device 71 on each of the two outer sections 36 of the handle.

For example, the holes 76, 77, 78 are arranged on a plate-shaped part 70, which is expediently located between the vertical frame section 14, especially a frame element 15, and the handle 12. The plate-shaped part 70 is in particular attached to the vertical frame section 14. Expediently, two plate-shaped parts 70 are present, each plate-shaped part 70 being arranged on a different longitudinal side 9 of the transport vehicle 2, in particular of the vertical frame section 14, expediently to a different frame element 15.

The positioning mechanism 26 further has an angled surface 75 over which the locking element 73 is guided and thus pretensioned when the handle 12 is swivelled. The angled surface 75 is expediently arranged in such a way that when the handle 12 is swivelled from the aforementioned fourth swivel position, the locking element 73 is first guided over the angled surface 75 before the locking element 73 reaches the locking structure, in particular one of the holes 76, 77, 78. The angled surface 75 is exemplarily designed as a section of the plate-shaped part 70, in particular as an angled tab.

The angled surface 75 makes it possible to move the handle 12 from the fourth swivel position to the second swivel position without having to manually operate the locking device 71, in particular the operating section 72.

Each plate-shaped part 70 further comprises exemplarily an anchorage point 79 for the belt 23, in particular an anchorage slot, which preferably runs vertically and is arranged in particular in the lower area of the plate-shaped part 70—i.e. below the holes 76, 77, 78.

On the handle 12, in particular on the outer section 36, there is further a pivot bearing 74, by means of which the handle 12 is pivotably mounted on the vertical frame section 14, in particular on the plate-shaped part 70. Expediently, a respective pivot bearing 74 is present on both outer sections 36 of handle 12.

In the following, the worktable 40 will be discussed in more detail, especially with reference to FIGS. 3 and 4, where the worktable is exemplarily aligned with its longitudinal axis in the x-direction.

The worktable 40 has an elongated, especially rectangular basic shape. Expediently, the worktable 40 is at least 1.5 times, especially twice, as long as it is wide. The worktable 40 has a worktable frame, which includes longitudinal work table frame elements 42 and transverse work table frame elements 43. The longitudinal worktable frame elements 42 and the transverse worktable frame elements 43 are expediently bar-shaped and especially designed as profiles. A table top 44 is mounted on the work table frame.

The worktable 40 has the fold-out table leg arrangement 46, which is exemplary U-shaped. The (when folded out) vertical sections of the table leg arrangement 46 shall also be called table legs. The table leg arrangement 46 is expediently located at the bottom side of the worktable 40, preferably in the area of one front side of the worktable 40. The table leg arrangement 46 is especially pivotally mounted at the worktable frame. The pivot axis of the table leg arrangement 46 is expediently aligned parallel to the transverse work table frame elements 43. The worktable frame and the underside of the table top 44 define an accommodation volume that accommodates the table leg arrangement 46 in the folded state, in particular completely. The folded state of the table leg arrangement 46 can also be referred to as transport position and the unfolded state as working position.

The worktable 40 has fixing elements 45, with which the table leg arrangement 46 can be fixed in the working position. As an example, the fixing elements 45 are plate-shaped elements, which are each provided at the upper end on a table leg and are mounted so that they can rotate around the respective table leg. The normal vector of the plate-shaped elements is always orthogonal to the longitudinal axis of the table legs, i.e. each table leg is always in the plane of the corresponding plate-shaped element. The plate-shaped elements can be moved into a locked and an unlocked position by swivelling. In the locked position, which is shown in FIGS. 3 and 4, for example, the plate-shaped elements are aligned parallel to the longitudinal worktable frame elements 42 and rest with their upper sides against the underside of the table top 44, so that the table leg arrangement 46 is locked in the folded-out position and cannot be folded in. In the unlocked position, the plate-shaped elements are aligned parallel to the transverse worktable frame elements 43 so that the table leg arrangement 46 can be folded in.

The worktable 40 is designed to correspond to the integrated table 18. In particular, the worktable frame elements 42, 43 and the horizontal frame elements 17 of the integrated table 18 comprise the same profiles or profiles of the same type, preferably of the same cross-section.

Preferably, the worktable frame elements 42 further comprise one or more support sections 27, for example a groove, in particular a V-groove, on which one or more further worktables 40 can be supported with their attachment element 41.

The table top 44 has a hole pattern, especially a regular hole pattern, preferably a hole grid. The table top 19 of the integrated table 18 preferably has a hole pattern, especially a regular hole pattern, preferably a hole grid. Expediently the hole patterns, especially the hole grids, of the two table tops 44, 19 have the same hole spacing.

In the following, a method shall be described for putting the transport device 1 from the transport configuration (see FIG. 1) into the working configuration (see FIG. 3).

First, the attachment of the worktable 40 to the worktable attachment interface 24 is released. For this purpose, the second attachment device 21—here the belt 23—is released. Furthermore, the first attachment device 20 is released by moving the worktable 40 in the direction away from the vertical frame section 14 into a predetermined tilting position. Expediently, in order to enable this tilting position, the handle 12 is moved to a corresponding swivel position, for example to the fourth swivel position described above.

The worktable 40 can then be completely removed from the transport vehicle 2. Next, the table leg arrangement 46 is unfolded and locked in the unfolded state by swivelling the fixing elements 45.

The worktable 40 is then brought into a horizontal orientation and mounted to a support section 27 of the transport vehicle 2 with its attachment element 41. The transport device 1 is then in the working configuration.

Below, the container attachment interface 6 and the box-shaped container 80 are explained in more detail, with particular reference to FIG. 1.

The container attachment interface 6 is used to attach the box-shaped container 80 to the lower section 3, especially the bottom part 4, of the transport vehicle 2, preferably in such a way that the box-shaped container 80 is fixed in all spatial directions.

The container attachment interface 6 is designed in such a way that the container 80 can be attached and/or detached from the container attachment interface 6 tool-free—i.e. without using tools.

As an example, the container attachment interface 6 has a movable coupling element 91, which is exemplarily designed as a rotary bolt, especially as a T-shaped rotary bolt. The movable coupling element 91 can be manually moved to different rotary positions in order to establish or release the attachment of the container 80 to the transport vehicle 2.

The movable coupling element 91 is exemplarily attached to the front 10 of the lower section 3 and is preferably rotatably mounted, especially around a y-axis of rotation.

The container attachment interface 6 preferably further comprises a non-moving coupling structure 92, which exemplarily comprises two recesses arranged in the support surface (5). The non-movable coupling structure 92 can be engaged with lower container couplers 82, in particular feet 85, as explained below.

The container attachment interface 6 and/or the transport vehicle 2 are especially designed in such a way that when attaching and/or removing one or more containers 80 at the container attachment interface 6, the transport vehicle 2, especially the vertical frame section 14, does not have to be disassembled or converted.

Preferably, the container attachment interface 6 and/or the container 80 is designed in such a way that, in a state fixed to the transport vehicle 2, the container 80 is fixed to the transport vehicle 2 with its bottom and front side, in particular only with its bottom and front side.

Now to the container 80:

The container 80 has a cuboid basic shape. As an example, the container 80 has a lower part 101 and a lid 102 which is placed on the lower part 101. The lid 102 is hinged to the lower part 101. Preferably the lower part 101 and the lid 102 have the same horizontal outer contour. The upper side of the container 80 is equipped with a carrying handle 103 which can be folded out.

Figure 23:
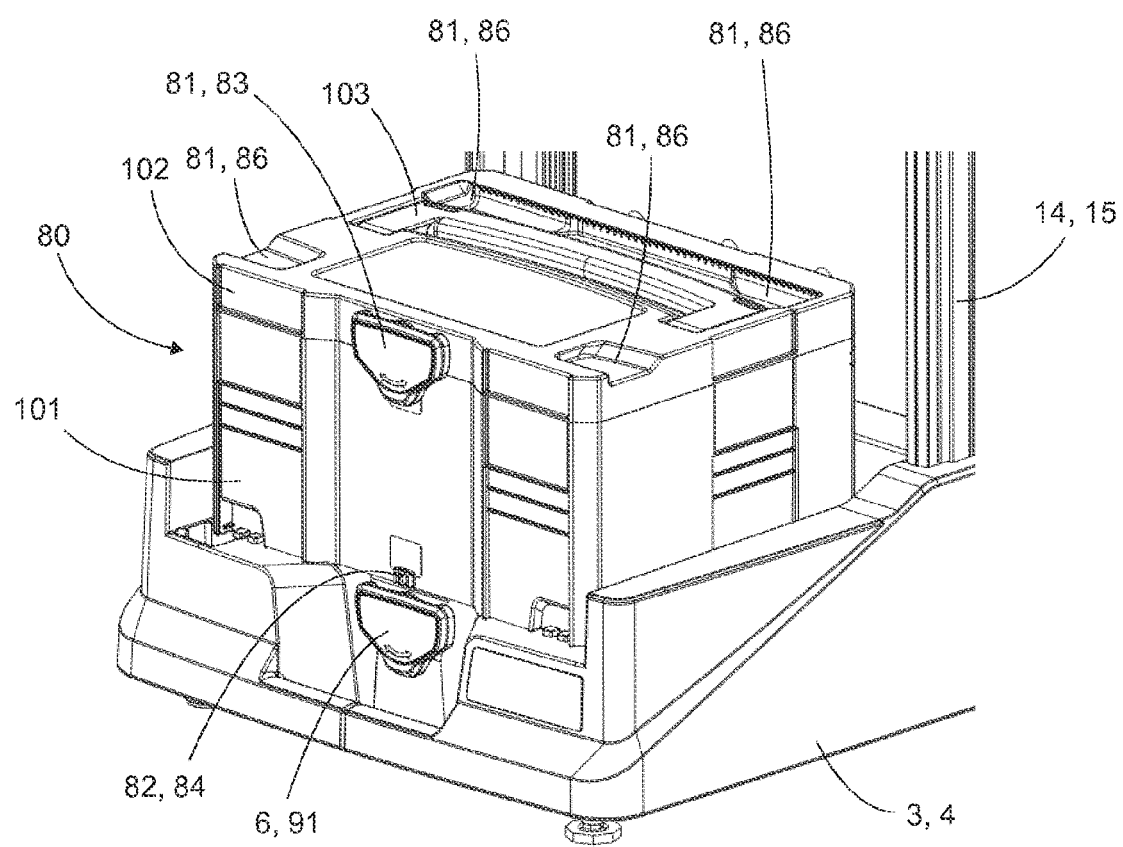

The container 80 has upper container couplers 81 and lower container couplers 82. The container couplers 81, 82 are shown in particular in FIGS. 21, 22 and 23. As an example, the upper container couplers 81 are designed to correspond to the lower container couplers 82, so that a further container 80 equipped with identical container couplers can be placed on the present container 80 and the lower container couplers 82 can be used to attach the further container 80 to the upper container couplers 81 of the present container 80, in particular in such a way that the two containers 80 are fixed in all spatial directions to each other and form a stable vertical stack 90.

The lower container couplers 82 comprise in particular a first non-movable coupling structure 84, for example a coupling projection which can be engaged with the movable coupling element 91. The non-movable coupling structure 84 is located in particular at the front of the container 80.

The lower container couplers further includes a second non-moving coupling structure 85, such as feet, which can engage with the non-moving coupling structure 92 and are located on the underside of the container 80.

FIG. 22 shows a vertical sectional view through the box-shaped container 80 in a state in which its second non-moving coupling structure 85, designed as feet, engages with the non-moving coupling structure 92 of the container attachment interface 6. As an example, the non-movable coupling structure 92 has a projection which is engaged behind by the feet, in particular the rear feet, expediently only the rear feet.

The upper container couplers 81 expediently comprise a movable coupling element 83, exemplarily a rotary bolt, in particular a T-shaped rotary bolt, which is expediently designed in correspondence to the movable coupling element 91. The movable coupling element 83 can be engaged in particular with the first non-movable coupling structure 84 of a further container 80. Furthermore, the movable coupling element 83 can be used to lock the lid 102.

The upper container couplers 81 further preferably include a third non-moving coupling structure 86, which may expediently be engaged with the second non-moving coupling structure 85 of a further container 80. The third non-moving coupling structure 86 preferably comprises one or more recesses and is located at the top of container 80.

The container 80 is designed in particular in such a way that, in a state fixed to a further container 80, the container 80 is fixed to the further container 80 with its bottom and front side, in particular only with its bottom and front side.

The containers 80 described above may, for example, be designed in accordance with the containers described in EP2315701B1.

The invention claimed is:

1. A transport device with a transport vehicle comprising:
a lower section having a support surface on which a stack of box-shaped containers can be placed, and a container attachment interface with which the stack can be attached to the lower section in a state in which the stack is placed on the support surface;
two wheels arranged in a rearward area of the transport vehicle at the lower section, with which wheels the transport vehicle can be supported and moved in a tilted position relative to a floor;
a vertical frame section extending upwardly from the lower section, which vertical frame section is arranged in the rearward area and on which a handle is provided with which the transport vehicle can be manually moved into the tilted position and moved relative to the floor; and
an elongated worktable and a worktable attachment interface provided on the transport vehicle, by means of which the elongated worktable can be attached to the transport vehicle in a vertical orientation of its longitudinal axis in order to assume a transport position in which the elongated worktable can be transported by the transport vehicle,
wherein the elongated worktable is selectively positionable in the transport position and in a stationary working position,
wherein the elongated worktable comprises an attachment element, and the transport vehicle comprises a support section, and the worktable attachment interface comprises a first attachment device,
wherein, in the stationary working position, the elongated worktable is oriented horizontally and engages, with its attachment element, with the support section, and is not attached to the first attachment device, and
wherein, in the transport position, the elongated worktable is attached, with its attachment element, to the first attachment device, and does not engage with the support section.

2. The transport device according to claim 1, wherein the worktable is completely removable from the transport vehicle tool-free.

3. The transport device according to claim 1, wherein the worktable can be attached to the transport vehicle in the rearward area by means of the worktable attachment interface.

4. The transport device according to claim 1, wherein the worktable in the transport position is arranged in the rearward direction behind the vertical frame section.

5. The transport device according to claim 1, wherein the worktable attachment interface comprises the first attachment device arranged at the lower section.

6. The transport device according to claim 5, wherein the first attachment device comprises an attachment structure engageable with the attachment element arranged at the worktable.

7. The transport device according to claim 5, wherein the lower section has an angled upper side in the area of the first attachment device.

8. The transport device according to claim 1, wherein the first attachment device is adapted such that the worktable can be mounted with the attachment element to the first attachment device in a tilted orientation relative to the vertical frame section and can be fixed to the first attachment device by pivoting the worktable towards the vertical frame section.

9. The transport device according to claim 1, wherein the worktable attachment interface has a second attachment device arranged on the vertical frame section.

10. The transport device according to claim 9, wherein the second attachment device comprises a belt with which the worktable can be fixed to the vertical frame section in the transport position.

11. The transport device according to claim 1, wherein the transport device has a positioning mechanism with which the handle can be moved into at least two different positions.

12. The transport device according to claim 1, wherein the transport vehicle has the support section to which the worktable can be attached in the horizontal orientation, in order to assume the stationary working position.

13. The transport device according to claim 12, wherein the worktable attachment interface comprises the first attachment device arranged at the lower section, wherein the first attachment device comprises an attachment structure engageable with the attachment element arranged at the worktable, wherein, in the horizontal orientation, the worktable can be attached to the support section with the attachment element, in order to assume the stationary working position.

14. The transport device according to claim 1, wherein the worktable has an unfoldable table leg arrangement.

15. The transport device according to claim 14, wherein the worktable has at least one fixing element with which the table leg arrangement can be fixed in an unfolded working position.

16. The transport device according to claim 1, further comprising the stack arranged on the support surface and attached to the lower section by the container attachment interface.

17. The transport device according to claim 1, wherein the attachment element is arranged at an end of the elongated worktable in longitudinal direction.

18. The transport device according to claim 1, wherein the elongated worktable has to be removed completely from the transport vehicle in order to bring the elongated worktable from the transport position into the stationary working position.

19. The transport device according to claim 1, wherein the elongated worktable has to be rotated with its longitudinal axis both vertically and horizontally, in order to bring the elongated worktable from the transport position into the stationary working position.

20. The transport device according to claim 1, wherein, in the transport position, the attachment element is completely removed from the support section.

21. A transport device with a transport vehicle comprising:
a lower section having a support surface on which a stack of box-shaped containers can be placed, and a container attachment interface with which the stack can be attached to the lower section in a state in which the stack is placed on the support surface;
two wheels arranged in a rearward area of the transport vehicle at the lower section, with which wheels the transport vehicle can be supported and moved in a tilted position relative to a floor;
a vertical frame section extending upwardly from the lower section, which vertical frame section is arranged in the rearward area and on which a handle is provided with which the transport vehicle can be manually moved into the tilted position and moved relative to the floor; and
an elongated worktable and a worktable attachment interface provided on the transport vehicle, by means of which the elongated worktable can be attached to the transport vehicle in a vertical orientation of its longitudinal axis in order to assume a transport position in which the elongated worktable can be transported by the transport vehicle,
wherein the transport device has a positioning mechanism with which the handle can be moved into at least two different positions,
wherein the handle is movable into a first position in which, in a state in which the worktable is in the transport position, the handle limits the maximum tilt angle of the worktable such that a tilt angle that must be assumed by the worktable to release the attachment of the worktable to the work table attachment interface cannot be assumed.

22. A method for putting a transport device from a transport configuration into a working configuration, the transport device comprising a transport vehicle with a lower section having a support surface for placing a stack of box-shaped containers and a container attachment interface for attaching the stack to the lower section, two wheels arranged in a rearward area of the transport vehicle at the lower section, for supporting and moving the transport vehicle in a tilted position relative to a floor, a vertical frame section extending upwardly from the lower section, which vertical frame section is arranged in the rearward area and on which a handle is provided for manually moving the transport vehicle into the tilted position and moving the transport vehicle relative to the floor, the transport device further comprising an elongated worktable and a worktable attachment interface provided on the transport vehicle, wherein the elongated worktable comprises an attachment element, the transport vehicle comprises a support section, and the worktable attachment interface comprises a first attachment device, wherein, in the transport configuration, the elongated worktable is in a transport position, in which the elongated worktable is attached, with its attachment element, to the first attachment device in a vertical orientation of the longitudinal axis of the elongated worktable, and in which transport position, the elongated worktable is transportable by the transport vehicle and does not engage with the support section, wherein, in the stationary working position, the elongated worktable is oriented horizontally with its longitudinal axis and engages, with its attachment element, with the support section, and is not attached to the first attachment device, the method comprising the steps:
releasing the attachment of the attachment element of the worktable to the first attachment device;
completely removing the worktable from the transport vehicle;
bringing the worktable into a horizontal orientation and engaging the attachment element of the worktable with the support section of the transport vehicle.

23. A method for putting a transport device from a transport configuration into a working configuration, the transport device comprising a transport vehicle with a lower section having a support surface for placing a stack of box-shaped containers and a container attachment interface for attaching the stack to the lower section, two wheels arranged in a rearward area of the transport vehicle at the lower section, for supporting and moving the transport vehicle in a tilted position relative to a floor, a vertical frame section extending upwardly from the lower section, which vertical frame section is arranged in the rearward area and on which a handle is provided for manually moving the transport vehicle into the tilted position and moving the transport vehicle relative to the floor, the transport device further comprising an elongated worktable and a worktable attachment interface provided on the transport vehicle, by means of which the elongated worktable is attached to the transport vehicle in a vertical orientation of its longitudinal axis in order to assume a transport position in which the elongated worktable is transportable by the transport vehicle, the method comprising the steps:

releasing the attachment of the worktable to the worktable attachment interface, completely removing the worktable from the transport vehicle, rotating the worktable with its longitudinal axis vertically in order to bring the worktable into a horizontal orientation, and rotating the worktable with its longitudinal axis horizontally, and mounting the worktable to a support section of the transport vehicle, in order to assume a stationary working position.

24. The method according to claim 23, wherein the worktable is rotated horizontally by 90 degrees, 180 degrees or 270 degrees, in order to bring the elongated worktable from the transport position into the stationary working position.

* * * * *